Nov. 18, 1969          G. A. HUGHES ET AL          3,479,344
                     13 β-ALKYL-6-OXAGONANES
Filed Aug. 30, 1965                           2 Sheets-Sheet 1

INVENTORS
GORDON ALAN HUGHES
HERCHEL SMITH
BY Vito Victor Bellino
                ATTORNEY Nov. 18, 1969     G. A. HUGHES ET AL     3,479,344

13β-ALKYL-6-OXAGONANES

Filed Aug. 30, 1965     2 Sheets-Sheet 2

INVENTORS
GORDON ALAN HUGHES
HERCHEL SMITH
BY Vito Victor Bellino
ATTORNEY

United States Patent Office 3,479,344
Patented Nov. 18, 1969

3,479,344
13β-ALKYL-6-OXAGONANES
Gordon Alan Hughes, Wayne, Pa., and Herchel Smith,
500 Chestnut Lane, Wayne, Pa. 19087; said Hughes
assignor to said Smith
Continuation-in-part of application Ser. No. 348,952,
Mar. 3, 1964. This application Aug. 30, 1965, Ser.
No. 483,528
Int. Cl. C07d *101/00;* A61k *17/00*
U.S. Cl. 260—240                            23 Claims

ABSTRACT OF THE DISCLOSURE

13β - lower alkyl-6-oxagona-1,3,5(10),8,14-pentaenes are prepared by treating a 7-alkoxy-chroman-4-one with a vinyl Grignard reagent to form a 7-alkoxy-4-vinyl-chroman-4-ol, condensing the chromanol with a 2-alkyl-cyclopentane-1,3-dione to form a 7-alkoxy-4-[2-(1-alkyl-2,5-dioxocyclopentyl)ethylidene]-chromane, and cyclizing said chromane under acidic conditions. The pentaene is selectively hydrogenated to form a 13β-lower algyl-6-oxagona-1,3,5(10),8-tetraene which may be isomerized to form the corresponding 1,3,5(10),9-tetraene which in turn is hydrogenated to form a 13β-lower alkyl-6-oxagona-1,3,5(10)-triene. The triene is reduced to form a 13β-lower alkyl-6-oxagona-2,5(10)-diene, which is hydrolyzed to form a 13β-lower alkyl-6-oxagon-4-ene. The 6-oxa steroids produced possess estrogenic, metrotropic, antilipemic, androgenic and progestational activity.

---

This application is a continuation-in-part of co-pending application Ser. No. 348,952 filed Mar. 3, 1964 which is a continuation-in-part of co-pending application Ser. No. 337,864 filed Jan. 15, 1964, both now abandoned which in turn were continuations-in-part of co-pending application Ser. No. 228,384, filed Oct. 4, 1962.

This invention is concerned with compositions of matter classifiable in the art of chemistry as unsaturated 13β-alkyl-6-oxagonanes, to intermediates therefor, and to processes for making and using such compositions.

The term "gonane," as used by chemists, refers to the unsubstituted tetracyclic perhydrocyclopentanophen-anthrene nucleus. The compositions of this invention are unsaturated gonanes which possess an oxygen in place of the carbon atom at position 6 of the gonane nucleus and hence are designated 6-oxagonanes. In the normal configuration of the gonane nucleus, the hydrogen atoms appearing at the 8-, 10-, and 13-positions possess what is designated as the β-configuration, i.e. they extend in a direction above the average plane of the tetracyclic ring system; and hydrogens present at the 9- and 14-positions possess what is designated as the α-configuration, i.e. they extend in a direction below the plane of the ring system.

In accordance with conventional chemical usage, compositions of this invention which possess the normal stereochemical configuration, are simply named as unsaturated 6-oxagonanes. Compositions of this invention which possess an isomeric stereochemical configuration are designated by a name which indicates the position at which the isomerism occurs, e.g. 6-oxa-8-isogonanes.

While the unsaturated 6-oxagonane compounds of the invention are named to describe the stereochemical configuration corresponding to that of the natural homocyclic steroids, it is to be understood that the product of each of the given reactions is a racemic mixture of the named compound and its enantiomorph.

In describing the invention, reference will be made in the following specification to the annexed drawings, wherein.

Figure 1:
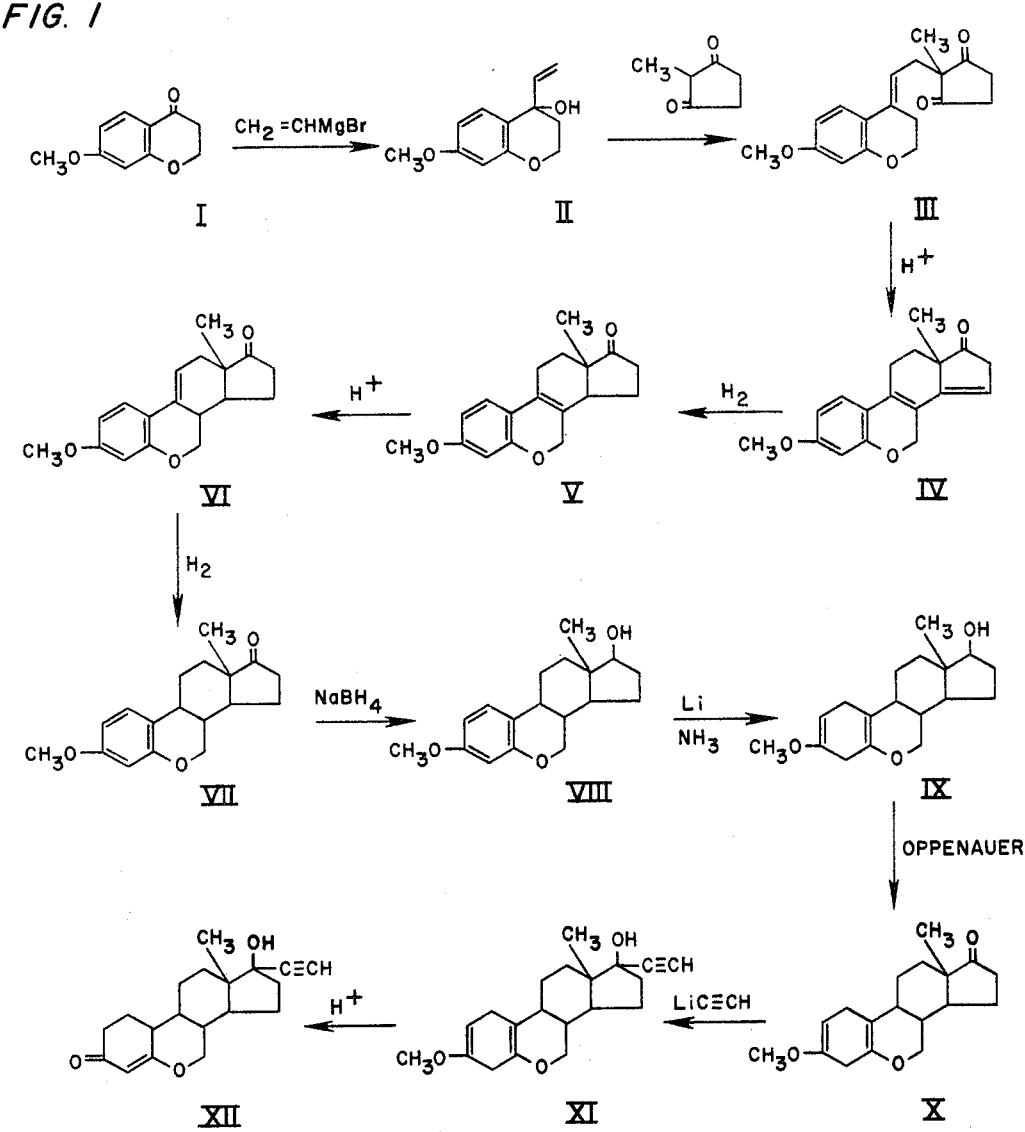
FIGURE 1 illustrates schematically the reaction sequence for preparing certain 13β-alkyl-6-oxagonanes, specifically 3-methoxy-13β-methyl-'6-oxagona - 1,3,5(10) - trien-17-one; 3-methoxy-13β-methyl-6-oxagona-1,3,5(10)-trien-17β-ol; and 17α-ethynyl-17β-hydroxy-'13β-methyl-6-oxagon-4-en-3-one.

The invention sought to be patented in a principal composition aspect is described as residing in the concept of a chemical compound having a 13β-alkyl-6-oxagonane structure.

The tangible embodiments of the composition aspects of the invention possess the inherent general physical properties of being white crystalline solids, are substantially insoluble in water, and are generally soluble in organic solvents such as ether and chloroform. Examination of the compounds produced according to the hereinafter described process reveals, upon ultraviolet and infrared spectrographic analysis, spectral data supporting the molecular structures set forth herein. Particularly evident are spectral features indicative of the 6-oxygen atom. The aforementioned physical characteristics, taken together with elemental analysis, the nature of the starting materials, and the mode of synthesis, confirm the structures of the compositions sought to be patented.

The tangible embodiments of the composition aspects of the invention possess the inherent applied use characteristics of exerting qualitatively varying hormonal effects in animals as evidenced by pharmacological evaluation according to standard test procedures. Such tangible embodiments show estrogenic, metrotropic, antilipemic, androgenic and progestational effects. This finding indicates their usefulness in the treatment of female hypogonadism, amenorrhea, dysmenorrhea, functional uterine bleeding, pregnancy maintenance, habitual abortion, and atherosclerosis, and their ability to achieve ovulation block and contraception.

In addition to their inherent applied use characteristics, the intermediate compositions of this invention are useful in practicing the process aspect of the present invention in the making of the 13β-alkyl-6-oxagonane compositions of the invention according to the sequence of reactions described herein.

The invention sought to be patented in a principal process of making the compositions aspect is described as residing in the concept of the sequence of reactions including: converting 7 - methoxychroman - 4 - one to 7-methoxy - 4 - vinylchroman - 4 - ol by means of a vinyl Grignard reagent; condensing said chromanol with a 2-alkylcyclopentane - 1,3 - dione to form 7-methoxy-4-[2-(1 - alkyl - 2,5 - dioxocyclopentyl)ethylidene]chromane; cyclizing said chromane under acidic conditions to form a 13β - alkyl - 3 - methoxy - 6 - oxagona-1,3,5(10),8,14-pentaen - 17 - one; selectively hydrogenating the 14-15 double bond of said 13β - alkyl - 3 - methoxy - 6 - oxagonapentaene to form the corresponding 13β - alkyl - 3-methoxy - 6 - oxagonatetraene compound of normal configuration; isomerizing by means of acid the 13β-alkyl-3-methoxy-6-oxagona-1,3,5(10),8-tetraene compound to the corresponding 13β - alkyl - 6 - oxagona - 1,3,5(10),9(11)-tetraene of normal configuration; hydrogenating the 13β- alkyl-3-methoxy-6-oxagona - 1,3,5(10),9(11)-tetraene to form a 13β - alkyl - 3 - methoxy - 6 - oxagona-1,3,5(10)-trien - 17 - one; reducing the 17-keto group and partially reducing the benzene ring of said 6-oxagonatriene to form a 13β - alkyl - 3 - methoxy - 6 - oxagona - 2,5,(10)-dien-17β-ol; oxidizing the hydroxy group of said 6-oxagonadienol by means of an Oppenauer oxidation to form a 17-ketone; ethynylating said ketone by means of lithium acetylide to form a 13β - alkyl - 17α - ethynyl-3-methoxy-6-oxagona - 2,5(10) - dien-17β-ol; and hydrolyzing the 3-methoxy group by means of acid to form a 13β-alkyl-17α-ethynyl-17β-hydroxy - 6 - oxagon - 4 - en-3-one.

The invention sought to be patented in a second composition aspect is described as residing in the concept of a chemical compound having a 4-vinylchroman-4-ol structure (FIGURE 1, II).

The tangible embodiments of said second composition aspect possess the applied use characteristic of being intermediates for the preparation of compositions exerting hormonal effects as evidenced by standard test procedures.

The invention sought to be patented in a third composition aspect is described as residing in the concept of a chemical compound having a 4 - [2 - (1 - alkyl - 2, 5-dioxocyclopentyl)ethylidene]chromane structure (FIGURE 1, III).

The tangible embodiments of said third composition aspect possess the applied use characteristic of being intermediates for the preparation of compositions exerting hormonal effects as evidenced by standard test procedures.

The invention sought to be patented in a forth composition aspect is described as residing in the concept of a chemical compound having a 13β - alkyl - 6-oxagona-1,3,5(10),8,14-pentaene structure (FIGURE 1, IV).

The tangible embodiments of said fourth composition aspect possess the applied use characteristic of exerting varying hormonal effects in animals as evidenced by pharmacological evaluation according to standard test procedures, including estrogenic and metrotropic effects. Furthermore, said tangible embodiments possess the use characteristics of being intermediates for the preparation of compositions exerting the same and other hormonal effects as evidenced by standard test procedures.

The invention sought to be patented in a fifth composition aspect is described as residing in the concept of a chemical compound having a 13β - alkyl - 6 - oxagona-1,3,5(10),8-tetraene structure (FIGURE 1, V).

The tangible embodiments of said fifth composition aspect possess the applied use characteristic of being intermediates for the preparation of compositions exerting hormonal effects as evidenced by standard test procedures.

The invention sought to be patented in a sixth composition aspect is described as residing in the concept of a chemical compound having a 13β - alkyl - 6 - oxagona-1,3,5(10),9(11)-tetraene structure FIGURE 1, VI).

The tangible embodiments of said sixth composition aspect possess the applied use characteristic of exerting a hormonal effect in animals as evidenced by pharmacological evaluation according to standard test procedure, particularly metrotropic activity. Furthermore, said tangible embodiments possess the use characteristic of being intermediates for the preparation of compositions exerting the same and other hormonal effects as evidenced by standard test procedures.

The invention sought to be patented in a seventh composition aspect is described as residing in the concept of a chemical compound having a 13β - alkyl - 6 - oxagona-1,3,5(10)-triene structure (FIGURE 1, VII, VIII).

The tangible embodiments of said seventh composition aspect possess the applied use characteristic of exerting a hormonal effect in animals as evidenced by pharmacological evaluation according to standard test procedure, particularly metrotropic activity. Furthermore, said tangible embodiments possess the use characteristic of being intermediates for the preparation of compositions exerting the same and other hormonal effects as evidenced by standard test procedures.

The invention sought to be patented in an eighth composition aspect is described as residing in the concept of a chemical compound having a 13β - alkyl - 6 - oxagona-2, 5(10)-diene structure (FIGURE 1, IX, X).

The tangible embodiments of said eighth composition aspect possess the applied use characteristic of being intermediates for the preparation of compositions exerting hormonal effects as evidenced by standard test procedures.

Figure 3:
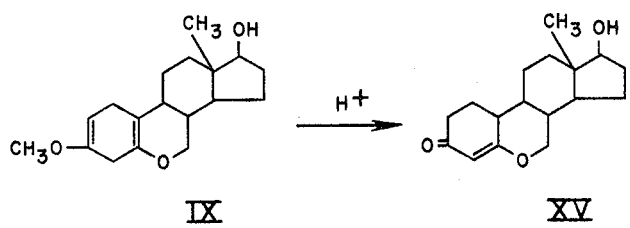
FIGURE 3 illustrates schematically the reaction for preparing certain 13β-alkyl-6-oxagonanes, specifically 17β-hydroxy-13β-methyl-6-oxagon-4-en-3-one.

The invention sought to be patented in a ninth composition aspect is described as residing in the concept of a chemical compound having a 13β - alkyl - 6 - oxagon-4-ene structure (FIGURE 3, XV).

The tangible embodiments of said ninth composition aspect possess the applied use characteristic of exerting a hormonal effect in animals as evidenced by standard test procedure, particularly androgenic and progestational activity.

Figure 2:
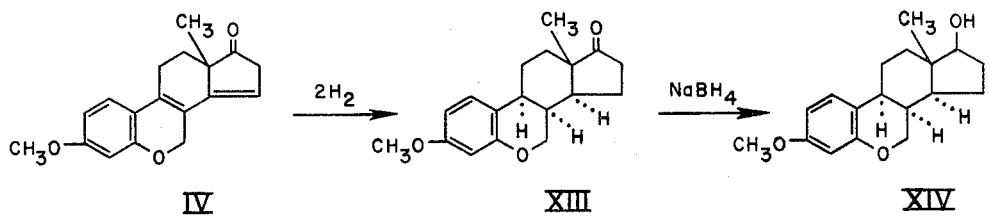
FIGURE 2 illustrates schematically the reaction sequence for preparing certain isomeric 13β-alkyl-6-oxa-8-isogonanes, specifically 3-methoxy-13β-methyl-6-oxa-8-isogona-1,3,5(10)-triene-17-one and 3-methoxy-13β-methyl-6-oxa-8-isogona-1,3,5(10)-trien-17β-ol.

The invention sought to be patented in a tenth composition aspect is described as residing in the concept of a chemical compound having the isomeric 13β - alkyl-6-oxa-8-isogona-1,3,5(10)-triene structure (FIGURE 2, XIII, XIV).

The tangible embodiments of said tenth composition aspect posses the applied use characteristic of exerting a hormonal effect in animals as evidenced by standard test procedure, particularly antilipemic activity.

The invention sought to be patented in a subgeneric aspect is described as residing in the concept of a chemical compound having a 13β - alkyl - 17α - alkynyl - 17β-hydroxy - 6 - oxagona - 2,5(10) - diene structure (FIGURE 1, XI), of which a specific embodiment, 17α-ethynyl-3-methoxy-13β-methyl - 6 - oxagona - 2,5(10)-dien-17-ol, is hereinafter described.

The tangible embodiments of said subgeneric aspect possess the applied use characteristic of being intermediates for the preparation of compositions exerting a progestational effect as evidenced by standard test procedure.

The invention sought to be patented in a second subgeneric composition aspect is described as residing in the concept of a chemical compound having a 13β-alkyl 17α-alkynyl-17β-hydroxy-6-oxagon-4-ene structure (FIGURE 1, XII), of which a specific embodiment, 17α-ethynyl-17β-hydroxy-13β-methyl-6-oxagon-4-en-3-one, is hereinafter described.

The tangible embodiments of said second subgeneric composition aspect possess the applied use characteristic of exerting a hormonal effect in animals as evidenced by pharmacological evaluation according to standard test procedure, having a particularly potent progestational effect.

The invention sought to be patented in a third subgeneric aspect is described as residing in the concept of a chemical compound having a 13β-alkyl-17α-haloethynyl - 17β - hydroxy - 6-oxagona-2,5(10)-diene structure (FIGURE 4, XVII) of which a specific embodiment, 17α-chloroethynyl - 13β - ethyl - 3 - methoxy - 6 - oxagona-2,5(10)-dien-17-ol is hereinafter described.

The tangible embodiments of said subgeneric aspect possess the applied use characteristic of being intermediate for the preparation of compositions exerting a progestational effect as evidenced by standard test procedure.

The invention sought to be patented in a fourth subgeneric composition aspect is described as residing in the concept of a chemical compound having a 13β-alkyl-17α-haloethynyl-17β-hydroxy-6-oxagon-4-ene structure (FIGURE 4, VIII) of which a specific embodiment, 17α-chloroethynyl- - 13β - ethyl - 17β - hydroxy - 6 - oxagon - 4-en-3-one, is hereinafter described.

The tangible embodiments of said fourth subgeneric composition aspect possess the applied use characteristic of exerting a hormonal effect in animals as evidenced by pharmacological evaluation according to a standard test procedure, having a particularly potent progestational effect.

The invention sought to be patented in a second process aspect is described as residing in the concept of a sequence of reactions including: converting a chroman-4-one (I) to a 4-vinylchroman-4-ol (II) by means of a vinyl Grignard reagent; condensing said chromanol with a 2-alkylcyclopentane-1,3-dione to form a 4-[2-(1-alkyl-2,5-dioxocyclopentyl)ethylidene]chromane (III); and cyclizing said chromane under acidic conditions to form a 13β - alkyl - 6 - oxagona - 1,3,5(10),8,14 - pentaen - 17-one (IV).

The invention sought to be patented in a third process aspect is described as residing in the concept to the sequence of reactions including: selectively reducing a 13β-alkyl-6-oxagona-1,3,5(10),8,14-pentaene (IV) by means of a selective catalyst-aprotic solvent combination to form a 13β-alkyl-6-oxagona-1,3,5(10),8-tetraene (V) of normal configuration.

The invention sought to be patented in a fourth process aspect is described as residing in the concept of isomerizing a 13β-alkyl-6-oxagona-1,3,5(10),8-tetraene (V) by means of acid to form a 13β-alkyl-6-oxagona-1,3,5(10), 9(11)-tetraene (VI) of normal configuration.

The invention sought to be patented in a fifth process aspect is described as residing in the concept of hydrogenating a 13β-alkyl-6-oxagona-1,3,5(10),9(11)-tetraene (VI) to form a 13β-alkyl-6-oxagona - 1,3,5(10) - triene (VII) of normal configuration.

The invention sought to be patented in a sixth process aspect is described as residing in the concept of the sequence of reactions including: partially reducing the benzene ring and reducing the keto group of a 13β-alkyl-3-methoxy-6-oxagona-1,3,5(10)-trien-17-one (VII) under Birch reduction conditions to form a 13β-alkyl-3-methoxy-6-oxagona-2,5(10)-dien-17β-ol (IX); and hydrolyzing the 3-methoxy group by means of mineral acid to form a 13β-alkyl-17β-hydroxy-6-oxagon-4-en-3-one (XV).

The invention sought to be patented in a seventh process aspect is described as residing in the concept of the sequence of reactions including: partially reducing the benzene ring and reducing the keto group of a 13β-alkyl-3-methoxy-6-oxagona-1,3,5(10-trien-17-one (VII) under Birch reduction conditions to form a 13β-alkyl-3-methoxy-6-oxagona-2,5(10)-dien-17β-ol (IX); oxidizing the 17-hydroxy group of said 6-oxagonadienol to form the corresponding 17-keto compound (X); ethynylating said ketone by means of lithium acetylide to form a 13β-alkyl-17α-ethynyl-3-methoxy-6-oxagona-2,5(10 - dien - 17β - ol (XI); and hydrolyzing the methoxy group by means of mineral acid to form a 13β-alkyl-17α - ethynyl - 17β-hydroxy-6-oxagon-4-en-3-one (XII).

The invention sought to be patented in an eighth process aspect is described as residing in the concept of hydrogenating a 13β-alkyl-6-oxagona - 1,3,5(10),8,14-pentaene (IV) to form the isomeric 13β-alkyl-6-oxa-8-isogona-1,3, 5(10)-triene (XIII).

The manner and process of making and using the invention will now be generally described so as to enable a person skilled in the art of chemistry to make and use the same as follows:

Referring now to FIGURE 1, the sequence of reactions involved in the synthesis of a specific embodiment, namely 17α-ethynyl-17β-hydroxy-13β-methyl-6-oxagon-4-en-3-one, is illustrated. 7-Methoxychroman-4-one (I) is treated with vinyl magnesium chloride in tetrahydrofuran to form 4-vinyl-7-methoxychroman-4-ol (II). Use of another vinyl Grignard such as vinyl magnesium bromide is also satisfactory. Condensation of the vinyl alcohol II with 2-methylcyclopentane-1,3-dione in basic alcoholic solution leads to the formation of 7-methoxy-4-[2-(1-methyl-2,5 - dioxocyclopentyl)ethylidene]chromane (III). This compound is cyclized under acidic conditions to form the tetracyclic ketone 3-methoxy-13β-methyl-6-oxagona-1,3, 5(10),8,14-pentaen-17-one (IV), which possesses metrotropic and estrogenic activities. The 14-15 unsaturation of compound IV is then selectively hydrogenated in the presence of 2% palladium on calcium carbonate until one equivalent of hydrogen is absorbed. A selective catalyst-solvent combination is required in order to saturate the 14(15) double bond and leave intact the 8(9) double bond. Catalysts such as palladium on calcium carbonate, palladium on strontium carbonate, palladium on charcoal, palladium on barium sulfate, and a moderately active Raney nickel are suitable in conjunction with aprotic solvents such as hydrocarbons and ethers. Typical of these solvents are benzene, toluene, dioxane, diethyl ether, and dibutyl ether. Protic solvents such as acetic acid and ethanol are largely non-selective. It is necessary to terminate the reaction after the absorption of one equivalent of hydrogen in order to avoid the production of the isomeric 8(9) saturated compound.

When compound V is refluxed under acidic conditions a rearrangement, or isomerization, occurs in which the 8(9) double bond is shifted to the 9(11) position, thus forming 3-methoxy-13β - methyl - 6 - oxagona - 1,3,5(10), 9(11)-tetraen-17-one (VI), which possess metrotropic activity. The unsaturation at the 9(11) position is then catalytically reduced using 10% palladium on charcoal until no more hydrogen is absorbed. The resulting compound is 3-methoxy-13β-methyl-6-oxagona-1,3,5(10)-trien-17-one (VII), which possesses metrotropic activity. This compound is then reduced to the corresponding 17β-alcohol (VIII) by means of sodium borohydride. The benzene ring of compound VIII is partially reduced by means of an alkali metal in liquid ammonia (Birch reduction) in the presence of ethanol, which serves as a proton donor, to produce 3-methoxy-13β-methyl-6-oxagona-2,5(10)-dien-17β-ol (IX).

The hydroxy group of compound IX is oxidized to a ketone by means of an Oppenauer oxidation, which utilizes aluminum isopropoxide and cyclohexanone as the reducible ketone. The product of this oxidation, 3-methoxy-13β-methyl-6-oxagona-2,5-(10)-dien-17-one (X), is ethynylated at the 17-position using lithium acetylide to form 17α-ethynyl-3-methoxy-13β-methyl-6-oxagona - 2,5(10) - dien-17β-ol (XI). Compound XI is then hydrolyzed by mineral acid to 17α-ethynyl-17β-hydroxy-13β-methyl-6-oxagon-4-en-3-one (XII).

Compound XII, when administered to experimental rabbits in the Clauberg procedure, was found to possess exceptionally high progestational activity.

Figure 4:
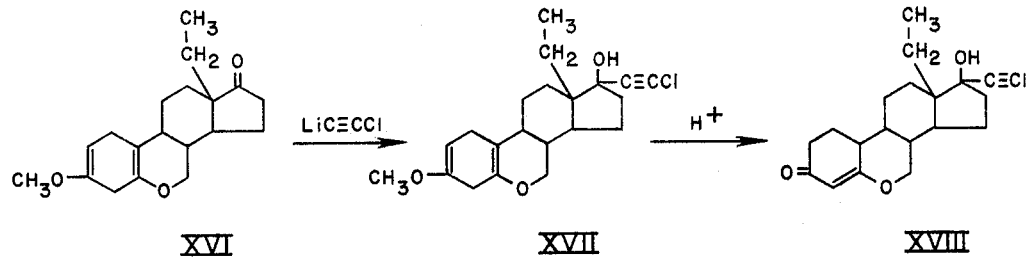
FIGURE 4 illustrates schematically the reaction sequence for preparing certain 13β-alkyl-17-haloalkynyl-6-oxagonanes, specifically 17α-chloroethynyl-13β-ethyl-17β-hydroxy-6-oxagon-4-en-3-one.

The Oppenauer product, 13β-ethyl-3-methoxy-6-oxagona-2,5(10)-dien-17-one (FIGURE 4, XVI), prepared as described for the corresponding 13-methyl compound, is chloroethynylated using lithium chloroacetylide to form 17α - chloroethynyl-13β-ethyl-3-methoxy-6-oxagona - 2,5 (10)-dien-17-ol (FIGURE 4, XVII). This compound is then hydrolyzed by acid to 17α - chloroethynyl-13β-ethyl-17β-hydroxy-6-oxagona-4-en-3-one (FIGURE 4, XVIII). This chloroethynyl-6-oxagonenone also has a high progestational activity.

Referring now to FIGURE 2, the sequence of reactions involved in the synthesis of a specific embodiment having the "isomeric" stereo-chemical configuration, namely 3-methoxy-13β-methyl-6-oxa-8-isogona - 1,3,5(10) - trien-17β-ol, is illustrated. The intermediate compound IV, obtainable as hereinbefore described, is hydrogenataed using 10% palladium on charcoal in absolute ethanol until two equivalents of hydrogen are absorbed to form 3-methoxy-13β-methyl-6-oxa-8-isogona - 1,3,5(10) - trien - 17 - one (XIII). Conventional catalysts and solvents may be utilized, there being no requirement for a selective catalyst-solvent combination as there is for the synthesis of compositions having the "normal" stereo-chemical configuration. Compound XIII is subsequently reduced to its corresponding alcohol, 3-methoxy-13β-methyl-6-oxo - 8-isogona-1,3,5(10)-trien-17β-ol (XIV), by means of sodium borohydride.

Compound XIV, when administered to experimental rats, was found to lower the cholesterol level in the blood, and thus to possess antilipemic activity.

Referring now to FIGURE 3, the reaction involved in the synthesis of another specific embodiment, 17β-hydroxy-13β-methyl-6-oxagon-4-en-3-one (XV), is illustrated. Compound IX is hydrolyzed by means of a strong acid such as hydrochloric acid to form the specific embodiment XV.

Referring again to FIGURES 1 and 2, particularly to the reactions involved in the saturation of the 8(9), 9(11), and 14(15) double bonds, it has been stated above that saturation of a gona-1,3,5-(10),8,14-pentaene for a length of time sufficient to permit two equivalents of hydrogen to be absorbed, will result in the formation of an 8-isomeric compound.

In order to prepare compounds having the normal stereochemical configuration, one must limit the hydrogen absorption to one equivalent, and, in order to restrict such absorption to the 14(15) position and leave the 8(9) double bond intact, the selective catalyst-solvent combination is required. By isomerizing the 8(9) double bond to the 9(11) position, catalytic hydrogenation may be then employed to produce the 6-oxagonanes of normal configuration. The 9(11) double bond can also be removed by means of lithium or other alkali metal and liquid ammonia. This reduction is preferably performed in the presence of a primary or secondary amine such as aniline, p-toluidine, or diphenylamine in order to improve the yield of product.

As will be apparent by inspection of FIGURES 1, 2, 3, and 4, certain variants of the starting materials can be employed to perform the processes of this invention. It will be thus apparent that in place of the 7-methoxy group on the chromane ring system, there can be other lower alkoxy groups such as ethoxy, propoxy, isopropoxy, or butoxy; alkenyloxy groups such as allyloxy; cycloalkoxy groups such as cyclopentyloxy or cyclohexyloxy; a hydroxy group, or a hydrogen atom. When such starting materials are employed in the processes of this invention, there will be formed 6-oxagonanes bearing the corresponding lower alkoxy, alkenyloxy, cycloalkoxy, or hydroxy groups, or a hydrogen atom in the 3-position thereof. Furthermore, by starting with a 5, 6, 7, or 8-poly-substituted chromane, a 6-oxagonane which is correspondingly substituted in the 1, 2, 3, or 4-positions thereof is obtained. In the present invention, such compounds are the full equivalents of the 3-methoxy substituted compounds, are processes utilizing such starting materials are the full equivalents of processes starting with the methoxy compounds.

We can utilize, in place of 2-methylcyclopentane-1,3-dione, any 2-alkylcyclopentane-1,3-dione, in the condensation with the 4-vinyl-chroman-4-ol. Among the alkyl groups which can thus appear on the cyclopentane ring are ethyl-propyl, isopropyl, butyl, and cetyl. When used in the processes of this invention, such 2-alkylcyclopentane-diones are converted into 6-oxagonanes having an alkyl group in the 13β-position thereof. Such 13β-alkyl-6-oxagonanes are the full equivalents of the 13β-methyl-6-oxagonanes, and processes utilizing the alkyl starting materials and intermediates are the full equivalents of those processes utilizing the methyl compounds.

Cyclohexanediones can be used instead of cyclopentanediones in order to form D-homo-6-oxagonanes. Such D-homo compounds and the processes for preparing them are the full equivalents of the corresponding compounds having the cyclopentane ring and the processes for preparing them.

Certain compositions of this invention having a 17-hydroxy group may be converted to the corresponding ester derivatives by treatment according to conventional methods with, for example, acetic acid, propionic acid, valeric acid, caproic acid, phenylpropionic acid, cyclopentylpropionic acid, or their derivatives. In addition, the hydroxy group may be etherified.

Compositions having a 17-ketone function can be converted to the corresponding 17-hydroxy compounds by reduction with, for example, lithium aluminum hydride. These ketones can be treated with an organo-metallic reagent to introduce a group such as alkyl, alkenyl, or alkynyl into the 17α-position. These 17α substituents can be halogenated, as in the case of chloroethynyl, or hydroxylated, as for example, hydroxypropynyl.

They can be ketalized or thioketalized conventionally by treating with alcohols such as ethylene glycol, trimethylene glycol, ethanedithiol, or ethanol in the presence of an acid catalyst such as p-toluenesulfonic acid or sulfuric acid.

The chromanone starting materials utilized in the present invention are old or may be prepared according to methods known to the art. The specific compound 7-methoxychroman-4-one is described by Perkin et al., J. Chem. Soc. 1927, 2094. The specific compound 7-hydroxychroman-4-one is described by Naylor et al., J. Chem. Soc. 1958, 1190. One procedure employed involves the condensation of a phenol with an acrylate ester which is then hydrolyzed to form a carboxyethoxyphenol. The latter compound is then cyclized to a chromanone. An alternative method utilizes the condensation of a phenol with a β-halopropionyl halide to directly form the chromanone. By selection of an appropriately substituted phenol, chromanes having a variety of substituents on the 3-position thereof can be prepared.

Inspection of FIGURES 1, 2, 3 and 4 reveals that the first tetracyclic compounds that are formed according to the sequence of reactions that constitute the process aspects of the invention are 6-oxagona-1,3,5(10),8,14-pentaenes (FIGURES 1, IV). From these intermediates there can be prepared compounds having either the normal or the isomeric stereochemical configuration. Compounds having an aromatic or a reduced A-ring can also be formed from these key intermediates, as can compounds which have a variety of substituents at the 17-position. These versatile 6-oxagonapentaenes can be prepared by an alternate procedure, which is described hereinbelow for the typical compound 3-methoxy-13β-methyl-6-oxagona-1,3,5(10),8,14-pentaen-17-one.

m-Methoxyphenol is condensed with a haloacetic ester such as ethyl bromoacetate to form ethyl m-methoxyphenoxyacetate. This ester is then reduced by means of a reagent such as lithium aluminum hydride to form the corresponding ethanol, which is converted to a halo derivative by means of a reagent such as phosphorus tribromide. Condensation with sodium acetylide in liquid ammonia yields 4-m-methoxyphenoxy-1-butyne. When this butyne is treated with formaldehyde and a dialkylamine such as diethylamine, a Mannich reaction occurs, the product of which is 1-diethylamino-5-m-methoxyphenoxy-2-pentyne. Hydration in the presence of a mercury salt, e.g. mercuric sulfate, in aqueous sulfuric acid results in the formation of this ketamine is accompanied by the production of an elimination product, 5-m-methoxyphenoxy-1-penten-3-one. Either of these compounds, or a mixture of them, is subjected to a Michael condensation with 2-methylcyclopentane-1,3-dione in the presence of a base such as methanolic potassium hydroxide to form the trione 2-(5-m-methoxyphenoxy-3 - oxopentyl) - 2 - methylcyclopentane-1,3-dione. This latter compound is then double cyclodehydrated by dissolving in a solvent such as benzene containing a catalytic amount of p-toluenesulfonic acid and refluxing under a Dean-Stark trap until two equivalents of water are collected. Alternatively, the trione is treated with polyphosphoric acid at room temperature or slightly above until ring-closure is complete. The product is the key intermediate 3-methoxy-13β-methyl-6-oxagona-1,3,5(10),8,14-pentaen-17-one.

The compositions of this invention can be formulated for pharmaceutical use as solid capsules, tablets, suppositories, etc., by combining them with conventional carriers. Such conventional solid carriers include magnesium carbonate, magnesium stearate, talc, sugar, lactose, dextrin, pectin, starch, gelatin, tragacanth, methylcellulose, and sodium carboxymethylcellulose. Diluents, flavoring agents, solubilizers, lubricants, suspending agents, binders, or tablet-disintegrating agents may be employed. Liquid preparations such as solutions, suspensions, or emulsions may also be prepared. A water-propylene glycol solution may be used for parenteral injection. An aqueous suspension suitable for oral use can be made by utilizing natural or synthetic gums, resins, methylcellulose, or other well-known suspending agents.

EXAMPLE 1

4-vinyl-7-methoxychroman-4-ol

Add vinyl magnesium chloride (26 g.) in tetrahydrofuran (100 ml.) to a solution of 7-methoxychroman-4-one (30.8 g.) (Perkin et al., J. Chem. Soc. 1927, 2094) in tetrahydrofuran (110 ml.) at such a rate that the temperature does not rise above 30°. Stir this mixture for one hour and pour into a mixture of saturated ammonium chloride and crushed ice. Extract the product with ether, wash with water, and evaporate to obtain the title compound as an oil (37.1 g.). Infrared absorption peaks at 3.0, 6.17, and 8.6µ.

EXAMPLE 2

7-methoxy-4-[2-(1-methyl-2,5-dioxocyclopentyl)ethylidene]chromane

Reflux 4 - vinyl-7-methoxychroman-4-ol (25.4 g.) in methanol (75 ml.) with 2-methylcyclopentane-1,3-dione (21 g.) and potassium bicarbonate (0.1 g.) for twenty-four hours. Remove most of the methanol under reduced pressure, add ether, wash the solution with 10% aqueous sodium hydroxide, water, and brine, and dry. Evaporate the solvent and recrystallize the residue from methanol to give the title compound (12 g.). A further 2.25 g. may be obtained from the mother liquors; M.P. 104–0°. Infrared absorption peaks at 5.69, 5.82µ. Ultraviolet absorptions: $\nu$ maximum 264.5, 309 mµ ($\epsilon$ 15,500; 9,400).

*Analysis.*—Calcd. for $C_{18}H_{20}O_4$: C, 71.98%; H, 6.71%. Found: C, 72.17%; H, 6.73%.

EXAMPLE 3

7-methoxy-4-[2-(1-ethyl-2,5-dioxocyclopentyl)ethylidene]chromane

Reflux 4-vinyl-7-methoxychroman-4-ol (6.8 g.) under nitrogen for 17 hours in methanol (50 cc.) containing 2-ethylcyclopentane-1,3-dione (6.3 g.) and potassium bicarbonate (0.025 g.). Concentrate the solution to 10 cc. under reduced pressure, dilute with ether, wash with aqueous sodium bicarbonate, and dry. Evaporate to obtain the product as a clear yellow oil (8 g.), $\nu$ maximum 1,767, 1,724 cm.$^{-1}$; $\nu$ maximum 267 mµ ($\epsilon$ 11,470).

EXAMPLE 4

3-methoxy-13β-methyl-6-oxagona-1,3,5(10),8,14-pentaen-17-one

Dissolve 7 - methoxy - 4 - [2-(1-methyl-2,5-dioxocyclopentyl)ethylidene]chromane (12 g.) in warm ethanol (80 ml.) and add conc. hydrochloric acid dropwise until the mixture becomes turbid. Shake and warm until crystallization occurs (ca. 15 min.); then cool and filter. Recrystallize from methanol to produce 8 g. of the title compound, M.P. 148–52°; ultraviolet absorptions: maximum 245, 331 mµ ($\epsilon$ 13,800; 21,700).

EXAMPLE 5

13β-ethyl-3-methoxy-6-oxagona-1,3,5(10),8,14-pentaen-17-one

Heat 7 - methoxy - 4-[2-(1-ethyl-2,5-dioxocyclopentyl)ethylidene]chromane (0.2 g.) in ethanol (10 cc.) to reflux (steam bath) and add concentrated hydrochloric acid (0.2 cc.). Reflux the solution for five minutes longer, then allow to come to room temperature. Filter off the precipitate and dry to give the product (ca. 0.1 g.) as crystals, maximum 1,739, $\nu$ maximum 230, 246, 308 and 333 mµ ($\epsilon$ 12,350, 12,700, 11,000, and 16,100).

EXAMPLE 6

3-methoxy-13-methyl-6-oxagona-1,3,5(10),8,14-pentaen-17β-ol

Add sodium borohydride (1.0 g.) to a solution of 3-methoxy-13β-methyl-6-oxagona - 1,3,5(10),8,14-pentaen-17-one (0.6 g.) in tetrahydrofuran (20 cc.) and methanol (100 cc.) and stir the mixture for 1 hr. Pour the solution into water, extract with a mixture of ether and benzene, and wash, dry, and evaporate the solution. Recrystallize the residue from methanol to give the title compound (0.4 g.), M.P. 158–61°.

*Analysis.*—Calcd. for $C_{18}H_{20}O_3$: C, 76.30; H, 6.76%. Found: C, 76.10; H, 6.99%.

EXAMPLE 7

13β-ethyl-3-methoxy-6-oxagona-1,3,5(10),8,14-pentaen-17β-ol

Suspend 13β-ethyl - 3 - methoxy-6-oxagona-1,3,5(10),8,14-pentaen-17-one (1 g.) in methanol (50 ml.) and treat with sodium borohydride (1 g.). The mixture will boil spontaneously. After 30 min., add an excess of acetic acid, remove the solvent in vacuo and extract the residue with ether. Wash the ethereal solution successively with water, aqueous sodium bicarbonate, and water. Dry the solution, evaporate the solvent, and triturate the resultant product with ether to obtain a solid. Recrystallize from isopropanol to obtain the title compound (0.564 g.), M.P. 118–120°. Uultraviolet absorption: $\nu$ maxima 245, 331 mµ ($\epsilon$ 14,730, 20,550). Infrared absorption peak at 2.87 µ.

*Analysis.*—Calcd. for $C_{19}H_{22}O_3$: C, 76.48; H, 7.43%. Found: C, 76.42; H, 7.37%.

EXAMPLE 8

13β-ethyl-17,17-ethylenedioxy-3-methoxy-6-oxagona-1,3,5(10),8,14-pentaene

Reflux 13β-ethyl-3-methoxy - 6 - oxagona-1,3,5(10),8,14-pentaen-17-one (2.5 g.) in benzene (80 ml.) and ethylene glycol (22 ml.) with p-toluenesulfonic acid (0.3 g.) for 16 hrs. Cool the solution, pour into saturated sodium bicarbonate, and extract with ether. Wash the organic layer with brine, dry, and evaporate. Crystallize the residue from ethanol (40 ml.) to obtain the title compound (1.15 g.), M.P. 132–134°. Ultraviolet absorption: $\nu$ maxima 247, 333 mµ ($\epsilon$ 14,000, 19,200). Infrared absorption peaks at 6.2 and 6.26µ.

*Analysis.*—Calcd. for $C_{21}H_{24}O_4$: C, 74.09; H, 7:11%. Found: C, 74.17; H, 6.97%.

EXAMPLE 9

3-methoxy-13β-methyl-6-oxagona-1,3,5(10),8-tetraen-17-one

Shake 3-methoxy-13β-methyl-6-oxagona - 1,3,5(10),8,14-pentaen-17-one (0.5 g.) with prehydrogenated 2% palladium on calcium carbonate (167 mg.) in benzene (15 ml.) in an atmosphere of hydrogen until 42 cc. (1 equivalent) of hydrogen has been absorbed. Filter off the catalyst and evaporate the filtrate to dryness. Rrecrystallize the residue to obtain 0.3 g. of the title produce, which has the following ultraviolet absorption peaks: $\nu$ maximum 286.5, 307 mµ($\epsilon$ 9,000, 10,500). The compound may be recrystallized from tetrahydrofuran - methanol-water and melts at 140–150°.

EXAMPLE 10

3-methoxy-13β-methyl-6-oxagona-1,3,5(10),8-tetraen-17β-ol

To a slurry of 3-methoxy-13β-methyl-6-oxagona-1,3,5(10),8-tetraen-17-one (3.5 g.) in a methanol (150 cc.) add sodium borohydride (1.5 g.) and stir the mixture for 1 hour. Pour the solution into aqueous sodium bicarbonate and extract with ether. Wash the ethereal solution with water, 10% hydrochloric acid, water and dry. Evaporate the solvent and crystallize the residue from methanol to obtain the title compound (3.5 g.), M.P. 120–135°; infrared absorption peaks at 6.19 and 6.35µ; ultraviolet absorption peaks: ν maximum 285 and 307 mµ (ε 8,380 and 9,130).

*Analysis.*—Calcd. for $C_{18}H_{22}O_3$: C, 75.49; H, 7.75%. Found: C, 75.22; H, 7.53%.

EXAMPLE 11

13β-ethyl-3-methoxy-6-oxagona-1,3,5(10),8-tetraen-17-one

Shake 13β-ethyl-3-methoxy-6-oxagona - 1,3,5(10),8,14-pentaen-17-one (2 g.) in benzene (50 ml.) with pre-reduced 2% palladized calcium carbonate (0.5 g.) in an atmosphere of hydrogen until one equivalent of hydrogen (155 ml.) has been absorbed. Filter the catalyst, evaporate the solvent, and recrystallize the residue from methanol to obtain the title compound (1.3 g.), M.P. 129–134°. Ultraviolet absorption: ν maximum 286, 312 mµ (ε 6,700, 7,950). Infrared absorption peaks at 5.75, 6.19 and 6.86µ.

*Analysis.*—Calcd. for $C_{19}H_{22}O_3$: C, 76.78; H, 7.44%. Found: C, 76.52; H, 7.13%.

EXAMPLE 12

13β-ethyl-3-methoxy-6-oxagona-1,3,5(10),8-tetraen-17β-ol

Shake 13β-ethyl-3-methoxy-6-oxagona - 1,3,5(10),8,14-pentaen-17β-ol (1 g.) in benzene (35 ml.) with pre-reduced 2% palladized calcium carbonate (0.5 g.) in an atmosphere of hydrogen until one equivalent of hydrogen (82 ml.) has been absorbed. Filter the catalyst, evaporate the solvent, and recrystallize the residue from methanol to obtain the title compound (0.35 g.) as a methonalate. Dry at 80°/0.25 mm. to obtain the pure compound, M.P. 130–134°. Uultraviolet absorption: ν 287, 308 mµ (ε 8,100, 8,550). Infrared absorption peaks at 2.86, 6.19 and 6.36µ.

*Analysis.*—Calcd. for $C_{19}H_{24}O_3$: C, 75.97; H, 8:05%. Found: C, 75.66; H, 7.85%.

EXAMPLE 13

3-methoxy-13β-methyl-6-oxagona-1,3,5(10),9(11)-tetraen-17-one

Reflux 3-methoxy-13β-methyl-6-oxagona - 1,3,5(10),8-tetraen-17-one (1.6 g.) in methanol (10 ml.) and tetrahydrofuran (7 ml.) until complete solution has occurred. Add 1 ml. conc. hydrochloric acid and reflux for thirty minutes. Cool and allow the product to crystallize. Filter off the product and recrystallize from methanol-tetrahydrofuran to obtain the title product, M.P. 185–188°, ultraviolet absorption peaks: ν maximum 220, 260, 305, 314 (ε 18,800; 15,200; 13,800, 7,700; 7,000).

*Analysis.*—Calcd. for $C_{18}H_{20}O_3$: C, 76.03; H, 7.09%. Found: C, 75.99; H, 6.92%.

EXAMPLE 14

13β-methyl-3-methoxy-6-oxagona-1,3,5(10),9(11)-tetraen-17-β-ol

Suspend 13β-methyl-3-methoxy-6-oxagona - 1,3,5(10),9(11)-tetraen-17-one (0.9 g.) in tetrahydrofuran (15 ml.) and methanol (15 ml.), treat with sodium borohydride (0.5 g.), and allow to stand for 30 min. Add acetic acid (10 ml.), followed by water (500 ml.), and extract the mixture with ether. Wash the ethereal solution with aqueous sodium bicarbonate, then with water. Dry, evaporate the solvent, and recrystallize the residue from methanol to obtain the title compound (0.7 g.), M.P. 138–141°. Infrared absorption peak at 3.15µ.

EXAMPLE 15

3-methoxy-13β,17α-dimethyl-6-oxagona-1,3,5(10),9(11)-tetraen-17β-ol

Dissolve 13β-methyl-3-methoxy - 6 - oxagona-1,3,5(10),9(11)-tetraen-17-one (4 g.) in benzene (200 ml.). Add dropwise, with stirring over 5 min., an ethereal solution of methyl magnesium bromide (23.2 ml.; from the metal, 1.6 g.). Reflux the resulting solution for 1 hr., cool, pour onto ice, acidify with 5 N hydrochloric acid, and extract with ether. Wash the organic layer with saturated aqueous sodium bicarbonate, then water. Dry, evaporate the solvent, and recrystallize the residue from isopropanol to obtain the title compound (3.035 g.), M.P. 141–150°. Ultraviolet absorption: maxima 260, 267, 306 mµ (ε 14,770, 13,500, 6,480). Infrared absorption peak at 3.00µ.

EXAMPLE 16

13β-ethyl-3-methoxy-6-oxagona-1,3,5(10),9(11)-tetraen-17-one

Heat 13β - ethyl-3-methoxy-6-oxagona-1,3,5(10),8-tetraen-17-one (18 g.) in methanol (700 ml.) under reflux until solution is complete. Add concentrated hydrochloric acid (80 ml.) and reflux the mixture for 15 min., when the product will begin crystallizing out of the boiling solution. Cool the mixture, filter off the deposited crystals, and recrystallize from ethanol to obtain the title compound (14.3 g.), M.P. 158–162°. Ultraviolet absorption: ν maxima 263, 310 mµ (ε 15,000, 6,760). Infrared absorption peaks at 5.77, 6.14, 6.17, 6.19, and 6.36µ.

*Analysis.*—Calcd. for $C_{19}H_{22}O_3$: C, 76.78; H, 7.44%. Found: C, 76.65; H, 7.24%.

EXAMPLE 17

13β-ethyl-3-methoxy-6-oxagona-1,3,5(10),9(11)-tetraen-17β-ol

Suspend 13β - ethyl - 3 - methoxy-6-oxagona-1,3,5(10),9(11)-tetraen-17-one (4 g.) in methanol (15 ml.) and treat with sodium borohydride (1 g.). The mixture will boil spontaneously. After 45 min., add excess acetic acid, followed by water, and extract the mixture with ether. Wash the ethereal extract successively with water, aqueous sodium bicarbonate, and brine. Dry, evaporate the solvent, and crystallize the residue from aqueous methanol to obtain the title compound (3.8 g.) as the methanolate, M.P. 77–82°. Recrystallize from cyclohexane to obtain the pure material, M.P. 133–134°. Ultraviolet absorption: ν maxima 260, 268, 307 mµ (ε 15,700, 14,300, 7,160). Infrared absorption peaks at 2.85 and 6.1µ.

*Analysis.*—Calcd. for $C_{19}H_{24}O_3$: C, 75.97; H, 8.05%. Found: C, 76.44; H, 8.04%.

EXAMPLE 18

17β-acetoxy-13β-ethyl-3-methoxy-6-oxagona-1,3,5(10),9(11)-tetraene

Dissolve 13β - ethyl - 3 - methoxy-6-oxagona-1,3,5(10),9(11)-tetraen-17β-ol. (1 g.) in pyridine (4 ml.) and acetic anhydride (2 ml.) and allow to stand at room temperature for 2 days. Add methanol (5 ml.), pour the mixture into water, and extract with ether. Wash the ethereal extract successively with 5% hydrochloric acid, 5% aqueous sodium hydroxide, and brine. Dry, evaporate the solvent, and recrystallize the residue from methanol to obtain the title compound (0.85 g.), M.P. 129–131°. Ultraviolet absorption: ν maxima 260, 268, 307 mµ (ε 15,600, 14,450, 7,220). Infrared absorption peaks at 5.8 and 6.13µ.

*Analysis.*—Calcd. for $C_{21}H_{26}O_4$: C, 73.66; H, 7.66%. Found: C, 73.36; H, 7.60%.

EXAMPLE 19

3-methoxy-13β-methyl-6-oxagona-1,3,5(10)-triene-17-one

Hydrogenate 3-methoxy - 13β - methyl-6-oxagona-1,3,5(10)9(11)-tetraen-17-one (2.7 g.) in ethanol (25 ml.) and tetrahydrofuran (25 ml.) using prehydrogenated 10% palladium on charcoal (900 mg.) until uptake of hydrogen has ceased. Filter off the catalyst, evaporate to dryness, and recrystallize the residue from methanol to obtain 1.4 g. of the title product, M.P. 151–156°. Ultraviolet shows only aromatic absorption.

EXAMPLE 20

3-methoxy-13β-methyl-6-oxagona-1,3,5(10)-trien-17β-ol

Treat a suspension of 3-methoxy-13β-methyl-6-oxagona-1,3,5(10)-trien-17-one (1.4 g.) in methanol (150 ml.) with sodium borohydride (ca. 0.3 g.) and swirl until dissolution is complete. Decompose the excess reducing agent with acetic acid, remove most of the methanol in vacuo, add water, and extract with ether. Wash the ethereal solution with water, sodium bicarbonate solution, and then water, and dry. Evaporate the product to yield the solid title product having an infrared spectrum showing strong hydroxyl absorption and no ketone absorption.

EXAMPLE 21

17α-ethynyl-3-methoxy-13β-methyl-6-oxagona-1,3,5(10)-trien-17-ol

Pass a stream of purified acetylene through dimethylacetamide (100 cc.) and add 3-methoxy-13β-methyl-6-oxagona-1,3,5(10)-trien-17-one (1.0 g.) to the stirred solution. When the steroid has dissolved add lithium acetylide-ethylenediamine complex (1.5 g.) and stir the mixture for 1 hour. Pour the mixture onto ice and ammonium chloride and extract with ether. Wash, dry, and evaporate the ethereal solution and recrystallize the residue from methanol to obtain the title compound (0.43 g.), M.P. 178–181°; infrared absorption peaks at 3.93, 3.10, 6.20, 6.31, 7.95μ.

Analysis.—Calcd. for $C_{18}H_{22}O_3$: C, 76.89; H, 7.74%. Found: C, 76.61; H, 7.64%.

EXAMPLE 22

17α-ethynyl-3-methoxy-13β-methyl-6-oxa-8-isogona-1,3,5(10)-trien-17β-ol

Pass a stream of purified acetylene through dimethylacetamide (100 cc) and add 3-methoxy-13β-methyl-6-oxa-8-isogona-1,3,5(10)-trien-17-one (1 g.) to the stirred solution. When the steroid dissolves, add lithium acetylide-ethylenediamine complex (1.5 g.) and stir the mixture for 1 hour. Pour the mixture onto ice and ammonium chloride and extract with ether. Wash and dry the ethereal solution and evaporate the solvent. Filter the residue through a column of Florex with benzene, evaporate the elute, triturate the residue with cyclohexane and filter to obtain the title compound (0.62 g.), M.P. 145–150°: infrared absorption peaks at 3.04, 3.09, 4.77, 6.20, 6.32 and 7.97μ.

Analysis.—Calcd. for $C_{18}H_{22}O_3$: C, 76.89; H, 7.74%. Found: C, 76.61; H, 7.61%.

EXAMPLE 23

3-methoxy-13β,17α-dimethyl-6-oxagona-1,3,5(10)-trien-17β-ol

Suspend 3-methoxy-13β,17α-dimethyl-6-oxagona-1,3,5(10)9(11)-tetraen-17β-ol (0.5 g.) in tetrahydrofuran (25 ml.) and add to distilled liquid ammonia (100 ml.) containing aniline (2 ml.). Stir the solution and add small pieces of lithium until the blue color persists. Continue stirring for 15 min. and then discharge the blue color by adding acetone (10 drops). Evaporate the ammonia, add water, and extract the mixture with ether. Wash the ethereal layer successively with 10% hydrochloric acid, saturated aqueous sodium bicarbonate, and water. Dry, evaporate the solvent, and recrystallize the residue from cyclohexane to obtain the title compound (0.28 g.), M.P. 138–142°. Ultraviolet absorption: ν maximum 283 mμ (ε 2,840). Infrared absorption peak at 2.99μ.

Analysis.—Calcd. for $C_{19}H_{26}O_3$: C, 75.46; H, 8.67%. Found: C, 75.53; H, 8.55%.

EXAMPLE 24

13β-ethyl-3-methoxy-6-oxagona-1,3,5(10)-trien-17-one

Shake 13β-ethyl-3-methoxy-6-oxagona-1,3,5(10),9(11)-tetraen-17-one (5 g.) in benzene (250 ml.) with pre-reduced 2% palladized calcium carbonate (1.5 g.) in an atmosphere of hydrogen until uptake ceases, when 409 ml. of hydrogen will have been absorbed. Filter off the catalyst, evaporate the solvent, and recrystallize the residue twice from methanol to obtain the title compound (3.1 g.), M.P. 128–129°. Ultraviolet absorption: ν maxima 282, 289 mμ (ε 2,380, 2,380). Infrared absorption peak at 5.75μ.

Analysis.—Calcd. for $C_{19}H_{24}O_3$: C, 75.97; H, 8.05%. Found: C, 75.87; H, 7.94%.

EXAMPLE 25

13β-ethyl-3-methoxy-6-oxagona-1,3,5(10)-trien-17β-ol

Suspend 13β-ethyl-3-methoxy-6-oxagona-1,3,5(10-trien-17-one (1.5 g.) in methanol (60 ml.) and treat the mixture with sodium borohydride (0.6 g.). Stir for 1 hour at room temperature. Decompose the excess reagent with dilute acetic acid and pour the mixture into a saturated aqueous solution of sodium bicarbonate. Extract the solution with ether. Wash the organic extract with water, dry, and evaporate to dryness. Recrystallize the residue from cyclohexane to obtain the title compound (1.35 g.), M.P. 135–138°. Ultraviolet absorption: ν maxima 280, 288 mμ (ε 2,900, 2,900). Infrared absorption peaks at 2.85, 6.17 and 6.35μ.

Analysis.—Calcd. for $C_{19}H_{26}O_3$: C, 75.46; H, 8.67%. Found: C, 75.66; H, 8.49%.

EXAMPLE 26

13β-ethyl-3-methoxy-6-oxagona-1,3,5(10)-trien-17β-ol

Dissolve 13β-ethyl-3-methoxy-6-oxagona-1,3,5(10),9(11)-tetraen-17β-ol (2 g.) in tetrahydrofuran (100 ml.) and add to a stirred solution of distilled liquid ammonia (200 ml.) containing aniline (7 ml.). Add enough lithium to give the solution a permanent blue color (ca. 0.12 g.) and stir the mixture for 20 min. Discharge the blue color by adding a little acetone. Add dilute acetic acid, then warm water. Extract the mixture with ether. Wash the organic extract successively with 10% hydrochloric acid, water, saturated aqueous sodium bicarbonate, and brine. Dry, evaporate the solvent, and recrystallize the residue from cyclohexane to obtain the title compound (1.55 g.), M.P. 133–138°, undepressed by a sample prepared as described in the previous example.

EXAMPLE 27

17β-acetoxy-13β-ethyl-3-methoxy-6-oxagona-1,3,5(10)-triene

Shake 17β-acetoxy-13β-ethyl-3-methoxy-6-oxagona-1,3,5(10),9(11)-tetraene (0.5 g.) in ethyl acetate (50 ml.) with pre-reduced 2% palladized calcium carbonate (0.2 g.) in an atmosphere of hydrogen until uptake ceases, when 43.5 ml. will have been absorbed. Filter off the catalyst, evaporate the solvent, and crystallize the residue from methanol to obtain the title compound (0.275 g.), M.P. 115–116°. Ultraviolet absorption: ν maxima 282, 289 mμ (ε 2,000, 2,000). Infrared absorption peak at 5.75μ.

Analysis.—Calcd. for: $C_{21}H_{28}O_4$: C, 73.22; H, 8.19%. Found: C, 73.14; H, 7.90%.

EXAMPLE 28

13β-ethyl-17α-ethynyl-3-methoxy-6-oxagona,1,3,5(10)-trien-17β-ol

Dissolve 13β-ethyl-3-methoxy-6-oxagona-1,3,5(10)-trien-17-one (0.8 g.) in freshly distilled dimethylacetamide (100 ml.) and saturate with acetylene. Stir and add lithium acetylide-ethylenediamine complex (1.25 g.). Pass acetylene through the solution, at the same time periodically determining the infrared absorption of small aliquots. When no carbonyl absorption remains, pour the reaction mixture onto ice and ammonium chloride and extract the mixture with ether. Wash the ethereal layer with water, then with saturated aqueous sodium bicarbonate. Dry, evaporate the solvent, and crystallize the residue from cyclohexane to obtain the title compound (0.625 g.), M.P. 131–134°. Ultraviolet absorption: $\nu$ maxima 282, 289 m$\mu$ ($\epsilon$ 2,860, 2,860). Infrared absorption peaks at 2.9, 3.07, 6.18 and 6.85$\mu$.

Analysis.—Calcd. for $C_{21}H_{26}O_3$: C, 77.26; H, 8.03%. Found: C, 77.40; H, 8.08%.

EXAMPLE 29

13$\beta$-ethyl-17,17-ethylenedioxy-3-methoxy-6-oxagona-1,3,5(10)-triene

Reflux 13$\beta$-ethyl-3-methoxy-6-oxagona-1,3,5(10)-trien-17-one (0.5 g.) in benzene (20 ml.) and ethylene glycol (4 ml.) with p-toluenesulfonic acid (0.06 g.) for 12 hours, with continuous removal of water. Pour the cooled solution into saturated aqueous sodium bicarbonate and extract with ether. Dry the ethereal solution, evaporate the solvent, and crystallize the residue from methanol to obtain the title compound (0.275 g.), M.P. 80–82°. Ultraviolet absorption: $\nu$ maxima 282, 288 m$\mu$ ($\epsilon$ 3,020, 2,840). Infrared absorption peaks at 6.18 and 6.33$\mu$.

Analysis.—Calcd. for $C_{21}H_{28}O_4$: C, 73.22; H, 8.19%. Found: C, 73.27; H, 7.89%.

EXAMPLE 30

3-methoxy-13$\beta$-methyl-6-oxagona-2,5(10)-dien-17$\beta$-ol

Dissolve 3 - methoxy-13$\beta$-methyl-6-oxagona-1,3,5(10)-trien-17-one (500 mg.) in tetrahydrofuran (80 ml.) and add with vigorous stirring to distilled liquid ammonia (170.0 ml.). Add lithium metal (500 mg.) as rapidly as possible and stir for one hour. Add dropwise ethanol (9 ml.) in tetrahydrofuran (20 ml.) to dissipate the blue color. Work up by adding water and extracting with ether. Crystallize from ether-hexane to obtain 420 mg. of the title compound. The product melts at 177–183° and shows no selective ultraviolet absorption above 22 m$\mu$. Infrared absorption peaks at 2.87, 5.88, and 5.98$\mu$.

EXAMPLE 31

3-methoxy-13$\beta$-methyl-6-oxagona-2,5(10)-dien-17-one

Add dropwise 1 g. of freshly distilled aluminum isopropoxide in dry toluene (25 ml.) to a solution of 3-methoxy-13$\beta$-methyl-6-oxagona-2,5(10)-dien-17$\beta$-ol (1.4 g.) in dry toluene (70 ml.) and freshly distilled cyclohexanone (17 ml.). After refluxing for three hours and cooling, add 3 ml. water and 10 g. anhydrous $Na_2SO_4$. Filter, washing the filter cake with chloroform, and evaporate the solvents. Triturate the residue with methanol to obtain the title product in 80% yield (960 mg.); M.P. 141–149°. Infrared absorption peaks at 5.72, 5.9, and 6$\mu$; no hydroxyl absorption.

EXAMPLE 32

17$\alpha$-ethynyl-3-methoxy-13$\beta$-methyl-6-oxagona,2,5(10)-dien-17$\beta$-ol Dissolve 3-methoxy-13$\beta$-methyl-6-oxagona-2,5(10)-dien-17-one (900 mg.) in dimethylacetamide (100 ml.) saturated with acetylene. Bubble acetylene through the solution and then quickly add lithium acetylide-ethylene diamine (1.25 g.). After one hour, work up the reaction mixture by pouring onto ice water-ammonium chloride, extract with ether, and wash with water, sodium bicarbonate, and water. Evaporate the solvents and recrystallize the residue from methanol to obtain 600 mg. of the title product, M.P. 124–129°. Infrared absorption peaks at 2.4–3.1, 5.9, and 6$\mu$.

EXAMPLE 33

13$\beta$-ethyl-3-methoxy-6-oxagona-2,5(10)-diene-17$\beta$-ol

Add 13$\beta$-ethyl-3-methoxy-6-oxagona-1,3,5(10) - trien-17$\beta$-ol (1.1 g.) in tetrahydrofuran (150 cc.) to distilled liquid ammonia (300 cc.), then add lithium (0.9 g.) and stir for 45 minutes. Add ethanol (30 cc. dropwise over 20 minutes and when the blue color is discharged add dilute acetic acid and then warm water. Extract with etherbenzene and wash the organic solution with water and brine. Evaporate the solvent and triturate the solid residue with boiling methanol, cool and filter to obtain the title compound (0.72 g.), M.P. 168–174°; infrared absorption peaks at 2.85, 5.88 and 5.98$\mu$.

EXAMPLE 34

13$\beta$-ethyl-3-methoxy-6-oxagona-2,5(10)-dien-17-one

To a dry solution of 13$\beta$-ethyl-3-methoxy-6-oxagona-2,5 (10)-dien-117$\beta$-ol (7 g.) in freshly distilled cyclohexanone (100 cc.) and toluene (450 cc.) add a solution of distilled aluminum isopropoxide (6.0 g.) in toluene (150 cc.) and reflux the mixture for 3 hours under nitrogen. Add water (18 cc.) to the cooled solution and stir vigorously for 15 minutes. Dry the mixture by adding anhydrous sodium sulfate, filter and evaporate under reduced pressure, heating finally at 150° C./0.2 mm. Crystallize the residue and triturate with methanol to obtain the title compound (5.3 g.), M.P. 132–139°: infrared absorption peaks at 5.78, 5.89 and 5.88$\mu$.

EXAMPLE 35

17$\alpha$-ethynyl-13$\beta$-ethyl-3-methoxy-6-oxagona-2,5(10)-dien-17-ol

Add 13$\beta$ - ethyl - 3-methoxy-6-oxagona-2,5(10)-dien-17-one (2.5 g.) to dimethylacetamide (200 cc.) previously saturated with acetylene and then add lithium acetylide-ethylenediamine complex (5.0 g.) and stir under a stream of acetylene for 1 hour. Pour the mixture into water and extract with a mixture of benzene and ether (1:1). Wash, dry and evaporate the organic solution and crystallize the residue from methanol to obtain the title compound (1.8 g.), M.P. 120–127°: infrared absorption peaks at 5.85 and 5.95$\mu$.

EXAMPLE 36

17$\alpha$-chloroethynyl-13$\beta$-ethyl-3-methoxy-6-oxagona-2,5(10)-dien-17-ol

Add 13$\beta$ - ethyl-3-methoxy-6-oxagona-2,5(10)-dien-17-one (2.8 g.) to a solution of lithium chloroacetylide [from 1.6 g. of lithium methyl and ca 2.5 cc. of dichloroethylene in ether (25 cc.)]. Stir the mixture for 1 hour and then pour into water and extract with ether. Wash, dry and evaporate the solvent and recrystallize the residue from methanol to obtain the title compound (3.0 g.), M.P. 162–174°: infrared absorption peaks at 3.02, 4.55, 5.89, 5.99$\mu$.

EXAMPLE 37

17$\beta$-hydroxy-13$\beta$-methyl-6-oxagon-4-en-3-one

Add dropwise 1 ml. conc, hydrochloric acid to 3-methoxy-13$\beta$-methyl-6-oxagona-2,5(10)-dien-17$\beta$-ol (400 mg.) in methanol (15 ml.) and allow the solution to stand for one hour at room temperature. Pour into water, work up by conventional ether extraction, and recrystallize the product from ethyl acetate-hexane to obtain 195 mg. of title compound, M.P. 199–201°. Uutraviolet absorption: $\nu$ maximum 259 m$\mu$ ($\epsilon$ 21,800). Infrared absorption peaks at 2.9, 6.1, and 6.25$\mu$.

Analysis.—Calcd. for $C_{17}H_{24}O_3$: C, 73.95; H, 8.70%. Found: C, 74.44; H, 8.50%.

EXAMPLE 38

17α-ethynyl-17β-hydroxy-13β-methyl-6-oxagon-4-en-3-one

Stir 17α-ethynyl-3-methoxy-13β-methyl-6-oxagona-2,5(10)-dien-17β-ol (0.4 g.) in methanol (18 ml.), hydrochloric acid (1.2 ml.), and water (0.8 ml.) for one hour. Pour the solution into brine, extract with ether, wash with water, and dry. Evaporate the solvent and crystallize the residue from ethyl acetate. Wash the residue with ether to obtain the title compound (0.2 g.), M.P. 229–232°: infrared absorption peaks at 2.95, 3.12, 6.1 and 6.28 mμ.

Analysis.—Calcd. for $C_{19}H_{24}O_3$: C, 75.97; H, 8.05%. Found: C, 75.83; H, 7.99%.

EXAMPLE 39

13β-ethyl-17β-hydroxy-6-oxagon-4-en-3-one

Suspend 13β-ethyl-3-methoxy-6-oxagona-2,5(10)-dien-17β-ol (1.0 g.) in methanol (36 cc.) add 10 N hydrochloric acid (2.4 cc.) and water (1.6 cc.) and allow to stand for 1 hour. Pour into water and extract with ether. Wash, dry and evaporate the solvent and recrystallize from ethyl acetate to obtain the title compound (0.2 g.), M.P. 201–205°: infrared absorption peaks at 3.05, 6.1 and 6.26 mμ: ultraviolet absorption peak; ν maximum 259 mμ (ε 20,380).

EXAMPLE 40

17α-ethynyl-13β-ethyl-17-hydroxy-6-oxagon-4-en-3-one

Suspend 17α - ethynyl-13β-ethyl-3-methoxy-6-oxagona-2,5(10)-dien-17-ol (1.0 g.) in methanol (50 cc.) and add 10 N hydrochloric acid (3.5 cc.) and water (3.0 cc.) and stir for 30 minutes. Pour the solution into water and extract with ether. Wash, dry and evaporate the ethereal solution and recrystallize the residue from ethyl acetate-hexane to obtain the title compound (0.3 g.), M.P. 183–186°: ultraviolet absorption peak: ν maximum 259 mμ (ε 20,500).

EXAMPLE 41

17α-chloroethynyl-13β-ethyl-17-hydroxy-6-oxagon-4-en-3-one

Slurry 17α - chloroethynyl - 13β-ethyl-3-methoxy-6-oxagona-2,5(10)-dien-17-ol (1.0 g.) in methanol (45 cc.) and add 10 N hydrochloric acid (3.0 cc.) and water (2.0 cc.) to the stirred solution. Stir for 1 hour and then pour into water and extract with ether. Wash, dry and evaporate the ethereal solution, and crystallize the residue from aqueous methanol to remove a by-product (ca. 100 mg.). Add water to the mother liquors and isolate the product with benzene. Recrystallize twice from ether to obtain the title compound (0.1 g.); M.P. 185–189°; ultraviolet absorption peak: ν maximum 260 mμ (ε18,500). Proton nuclear magnetic resonance and analysis indicated the presence of half a molecule of benzene of crystallization.

EXAMPLE 42

13β-ethyl-17β-hydroxy-6-oxa-8-isogon-4-en-3-one

To 13β-ethyl-3-methoxy-6-oxa-8-isogona-2,5(10)-dien-17β-ol (0.2 g.) in methanol (15 cc.) add oxalic acid dihydrate (0.258 g.) in water (2.5 cc.) and stir the mixture for 2 hours. Pour into water, extract with ether and wash, dry and evaporate the ethereal solution. Chromatograph the residue on silica gel and elute with ethyl acetatehexane (1:1). Recrystallize the solid eluate from ether-hexane to obtain the title compound (0.032 g.), M.P. 159–165°; ultraviolet absorption peak: ν maximum 264 mμ (ε 21,000).

Analysis.—Calcd. for $C_{18}H_{26}O_3$: C, 74.44; H, 9.03%. Found: C, 74.15; H, 9.18%

EXAMPLE 43

3-methoxy-13β-methyl-6-oxa-8-isogona-1,3,5(10)-trien-17-one

Hydrogenate 3 - methoxy-17β-methyl-6-oxagona - 1,3,5 (10),8,14-pentaen-17-one (3 g.) in absolute ethanol (50 ml.) and tetrahydrofuran (20 ml.) using 10% palladium on charcoal (667 mg.) until two equivalents of hydrogen are absorbed. Filter off the catalyst, evaporate the solvents, and recrystallize the residue from methanol to obtain 450 mg. of the title product, M.P. 139–143°.

Analysis.—Calcd. for: $C_{18}H_{22}O_3$: C, 75.49; H, 7.75%. Found: C, 75.14; H, 7.80%.

EXAMPLE 44

3-methoxy-13β-methyl-6-oxa-8-isogona-1,3,5(10)-trien-17β-ol

Treat 3-methoxy-13β-methyl-6-oxa-8-isogona-1,3,5(10)-trien-17-one (0.35 g.) in methanol (20 ml.) with sodium borohydride (0.2 g.) for one hour. Precipitate the product cautiously with water, and after filtration, recrystallize from methanol to obtain 0.22 g. of the title compound as the hemimethanolate.

Analysis.—Calcd. for $C_{18}H_{24}O_3 \cdot \frac{1}{2}$ $CH_3OH$: C, 73.10; H, 8.10%. Found: C, 73.40; H, 8.39%.

EXAMPLE 45

13β-ethyl-3-methoxy-6-oxa-8-isogona-1,3,5(10)-trien-17-one

Shake 13β - ethyl - 3-methoxy-6-oxagona-1,3,5(10),8,14-pentaen-17-one (1 g.) in ethanol (35 ml.) and tetrahydrofuran (35 ml.) with 10% palladized charcoal (0.334 g.) in an atmosphere of hydrogen until a volume corresponding to saturation of two ethylenic bonds has been absorbed. Filter off the catalyst, evaporate the solvents, and recrystallize the residue three times from methanol to obtain the title compound (0.42 g.), M.P. 134–141°. Ultraviolet absorption: ν maximum 282 mμ (ε 2,940). Infrared absorption peak at 5.76 μ.

Analysis.—Calcd. for $C_{19}H_{24}O_3$: C, 75.97; H, 8.05%. Found: C, 75.97; H, 7.74%.

EXAMPLE 46

13β-ethyl-3-methoxy-6-oxa-8-isogona-1,3,5(10)-trien-17-one

Dissolve 13β-ethyl-3-methoxy-6-oxa-8-isogona-1,3,5(10)-trien-17β-ol (1 g.) in acetone (75 ml.) containing anhydrous magnesium sulfate (0.6 g.). Add 8N chromic acid dropwise, with stirring, in an atmosphere of nitrogen until an orange color persists in the supernatant liquid. Continue stirring for a further 15 min. Add isopropanol (5 ml.), followed by solid sodium bicarbonate. Filter the mixture, evaporate to dryness, and take up the residue in ether. Wash with water and dry. Evaporate the solvent and recrystallize from methanol to obtain the title compound (0.668 g.), M.P. 137–139°, undepressed by the authentic sample prepared in the previous example.

EXAMPLE 47

13β-ethyl-3-methoxy-6-oxa-8-isogona-1,3,5(10)-trien-17β-ol

Shake 13β - ethyl - 3-methoxy-6-oxagona-1,3,5(10),8,14-pentaen-17β-ol (0.4 g.) in ethanol (70 ml.) with 10% palladized charcoal (0.134 g.) in an atmosphere of hydrogen until a volume corresponding to saturation of two ethylenic bonds has been absorbed. Filter off the catalyst, evaporate the solvent, and recrystallize the residue twice from ether hexane to obtain the title compound (0.137 g.), M.P. 109–111°. Ultraviolet absorption: ν maximum 285 mμ (ε 2,540). Infrared absorption peak at 2.90 μ.

Analysis.—Calcd. for $C_{19}H_{26}O_3$: C, 75.46; H, 8.67%. Found: C, 75.37; H, 8.52%.

EXAMPLE 48

17β-acetoxy-13β-ethyl-3-methoxy-6-oxa-8-isogona-1,3,5(10)-triene

Dissolve 13β - ethyl - 3 - methoxy-6-oxa-8-isogona-1,3,5(10)-trien-17β-ol (0.3 g.) in acetic anhydride (2 ml.) and pyridine (4 ml.) and allow to stand at room temperature for 18 hours. Remove the solvents under reduced pressure. Crystallize the residue from ether-hexane and recrystallize from methanol to obtain the title compound (0.277 g.), M.P. 112–113°. Ultraviolet absorption: λ maximum 283 mμ (ε 3,180). Infrared absorption peak at 5.77 μ.

Analysis.—Calcd. for $C_{21}H_{28}O_4$: C, 73.23; H, 8.19%. Found: C, 73.19; H, 7.93%.

EXAMPLE 49

13β-ethyl-17,17-ethylenedioxy-3-methoxy-6-oxa-8-isogona-1,3,5(10)-triene

Reflux 13β - ethyl-3-methoxy-6-oxa-8-isogona-1,3,5(10)-trien-17-one (0.2 g.) in toluene (100 ml.) and ethylene glycol (20 ml.) with p-toluenesulfonic acid (0.1 g.) for 21 hours, with continuous removal of water. Dilute the cooled solution with benzene. Wash with aqueous sodium bicarbonate, then water. Dry, evaporate the solvent, triturate the residue with ether, and recrystallize from methanol-isopropanol to obtain the title compound (0.1 g.), M.P. 123–126°. Ultraviolet absorption: λ maximum 282 mμ. Infrared absorption peaks at 6.18 and 6.65 μ.

Analysis.—Calcd. for $C_{21}H_{28}O_4$: C, 73.23; H, 8.19%. Found: C, 72.98; H, 7.89%.

EXAMPLE 50

13β-ethyl-17α-ethynyl-3-methoxy-6-oxa-8-isogona-1,3,5(10) trien-17β-ol

Saturate a solution of 13β-ethyl-3-methoxy-6-oxa-8-isogona-1,3,5(10)-trien-17-one (0.3 g.) in dimethylacetamide (100 cc.) with acetylene and then add lithium acetylide-ethylene diamine complex (0.4 g.) and stir the mixture in a stream of acetylene for 1 hour. Pour the mixture onto ice and ammonium chloride, extract with ether and wash, dry, and evaporate the ethereal solution. Evaporate the solvent and recrystallize the residue from cyclohexane and then from isopropanol to obtain title compound (0.115 g.), M.P. 155–157°; infrared absorption peaks at 2.93, 3.07μ; ultraviolet absorption peak: ν maximum 283 mμ (ε 2,970).

Analysis.—Calcd. for $C_{21}H_{26}O_3$: C, 77.27; H, 8.03%. Found: C, 76.84; H, 8.11%.

EXAMPLE 51

13β-ethyl-3-methoxy-6-oxa-8-isogona-2,5(10)-dien-17β-ol

Add lithium (0.5 g.) to a solution of 13β-ethyl-3-methoxy-6-oxa-8-isogona-1,3,5(10)-trien-17β-ol (0.5 g.) in tetrahydrofuran (50 cc.) and liquid ammonia (150 cc.) and stir the mixture vigorously for 1 hour. Add ethanol (26 cc.) over 5 minutes, evaporate the ammonia and acidify to $pH_6$ with acetic acid. Extract the mixture with ether, wash the ethereal solution with aqueous sodium bicarbonate, water and evaporate the solvent under reduced pressure. Recrystallize the residue from methanol to obtain the title compound (0.217 g.), M.P. 116–124°; infrared absorption peaks at 5.87, 5.98μ.

The subject matter which the applicants regard as their invention is particularly pointed out and distinctly claimed as follows:

1. 3-lower alkoxy-13β-lower alkyl-6-oxagona-1,3,5(10), 8,14-pentaene wherein the 17-position is a member of the group consisting of keto, the cyclic ethylene ketal thereof, and β-hydroxymethylene.

2. 3-lower alkoxy-13β-lower alkyl-6-oxagona-1,3,5(10), 8-tetraene wherein the 17-position is a member of the group consisting of keto, the cyclic ethylene ketal thereof, and β-hydroxymethylene.

3. 3-lower alkoxy-13β-lower alkyl-6-oxagona-1,3,5(10), 9(11)-tetraene wherein the 17-position is a member of the group consisting of keto and the cyclic ethylene ketal thereof, and β-hydroxymethylene and a lower alkyl carboxylic acid ester thereof.

4. 3-lower alkoxy-13β-lower alkyl-6-oxagona-1,3,5(10)-triene wherein the 17-position is a member of the group consisting of keto and the cyclic ethylene ketal thereof, β-hydroxymethylene, lower alkyl carboxylic acid acyloxymethylene, α-lower alkynyl β-hydroxymethylene, and α-lower alkyl β-hydroxymethylene.

5. 3-lower alkoxy-13β-lower alkyl-6-oxagona-2,5(10)-diene wherein the 17-position is a member of the group consisting of keto, β-hydroxymethylene, α-lower alkynyl β-hydroxymethylene, and α-halo-lower alkynyl β-hydroxymethylene.

6. 13β-lower alkyl-6-oxagona-4-en-3-one wherein the 17-position is a member of the group consisting of β-hydroxymethylene, α-lower alkynyl β-hydroxymethylene, and α-halo-lower alkynyl β-hydroxymethylene.

7. 3-lower alkoxy-13β-lower alkynyl-6-oxa(gon)-8-isogona-1,3,5(10)-triene wherein the 17-position is a member of the group consisting of keto, β-hydroxymethylene, lower alkyl carboxylic acid acyloxy methylene, α-lower alkynyl β-hydroxymethylene, and α-lower alkyl β-hydroxymethylene.

8. 3-lower alkoxy-13β-lower alkyl-17α-lower alkynyl-17β-hydroxy-6-oxagona-2,5(10)-diene.

9. 13β-lower alkyl-17α-lower alkynyl-17β-hydroxy-6-oxagon-4-ene.

10. 3-lower alkoxy-13β-lower alkyl-17α-halo lower alkynyl-17β-hydroxy-6-oxagona-2,5(10)-diene.

11. 13β-lower alkyl-17α-halo lower alkynyl-17β-hydroxy-6-oxagon-4-ene.

12. 7-lower alkoxy-4-vinyl chroman-4-ol.

13. 7-lower alkoxy-4-[2-(1-lower alkyl - 2,5 - dioxocyclopentyl)-ethylidene]chromane.

14. 7-methoxy-4-vinylchroman-4-ol.

15. 7 - methoxy - 4 - [2 - (1 - methyl - 2,5 - dioxocyclopentyl)ethylidene]chromane.

16. 7 - methoxy - 4 - [2 - (1 - ethyl - 2,5 - dioxocyclopentyl)ethylidene]chromane.

17. 3 - methoxy-13β-methyl-6-oxagona-1,3,5(10),8,14-pentaen-17-one.

18. 13β - ethyl - 3 - methoxy-6-oxagona-1,3,5(10),8,14-pentaen-17-one.

19. 17α - ethynyl - 3 - methoxy-13β-methyl-6-oxagona-1,3,5(10)-trien-17β-ol.

20. 17α - ethynyl - 3 - methoxy - 13β - methyl-6-oxa-8-isogona-1,3,5(10)-trien-17β-ol.

21. 17α - ethynyl -17β-hydroxy-13β-methyl-6-oxagon-4-en-3-one.

22. 17α - ethynyl-13β-ethyl-17-hydroxy-6-oxagon-4-en-3-one.

23. 17α - chloroethynyl - 13β - ethyl - 17β - hydroxy-6-oxagon-4-en-3-one.

References Cited

UNITED STATES PATENTS

| | | | |
|---|---|---|---|
| 3,150,140 | 9/1964 | Cross et al. | 260—345.3 XR |
| 3,328,408 | 6/1967 | Hughes et al. | 260—289 XR |
| 3,219,668 | 11/1965 | Brown et al. | 260—294.7 |
| 3,202,686 | 8/1965 | Hughes et al. | 260—392.45 |

OTHER REFERENCES

Windholz, et al., J. Org. Chem., vol. 28, pp. 1092–4 (1963).

Smith et al., Experciatia, vol. 20, pp. 418–9 (1964) QAE9.

Hoursman et al., Rev. Trav. Chem., vol. 82, pp. 898–900 (1963) QDR3.

HENRY R. JILES, Primary Examiner

JOHN M. FORD, Assistant Examiner

U.S. Cl. X.R.

260—345.3, 999